Nov. 24, 1964  R. D. ESTANDIAN  3,158,160
PORTABLE DISH WASHER
Filed April 21, 1964
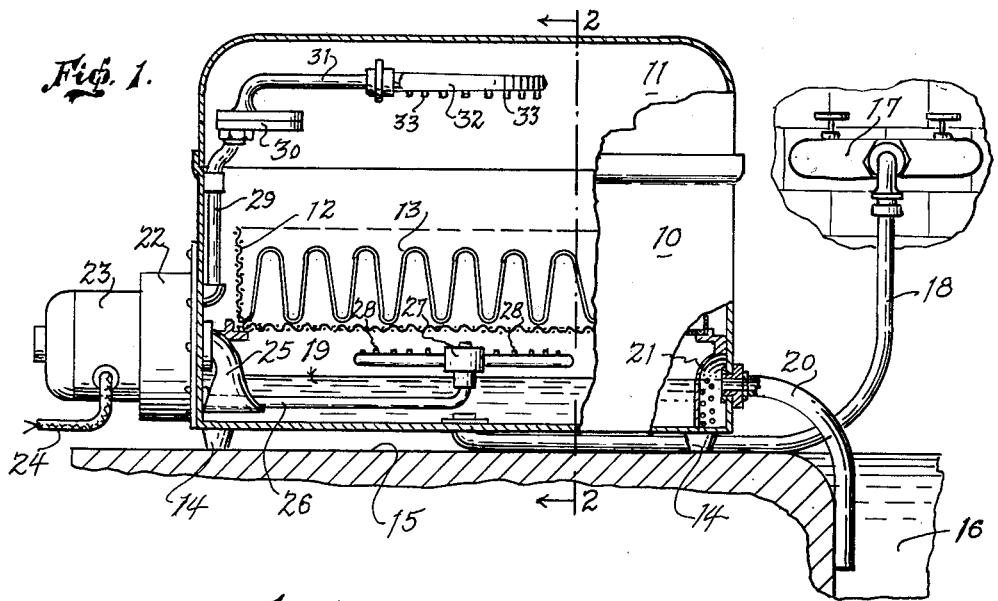
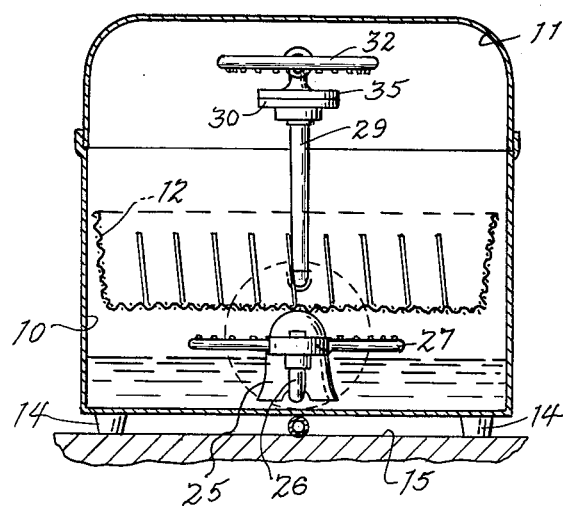
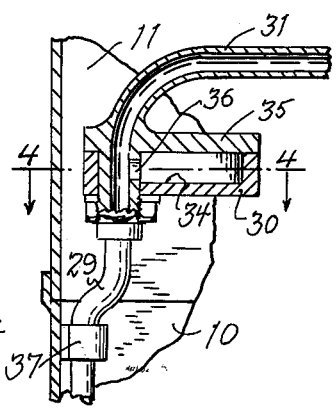
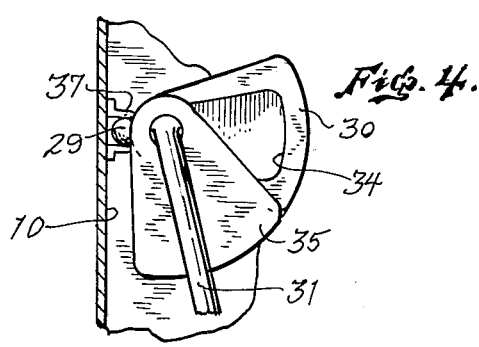
INVENTOR.
RAMON D. ESTANDIAN.
BY
W. H. Atkinson
ATTORNEY

United States Patent Office 3,158,160
Patented Nov. 24, 1964

3,158,160
PORTABLE DISH WASHER
Ramon D. Estandian, 482 Sanchez St.,
San Francisco, Calif.
Filed Apr. 21, 1964, Ser. No. 361,328
1 Claim. (Cl. 134—93)

My invention relates to dish washing machines and the like, and particularly to a device of this character intended and adapted to be placed in and used on the drainboard of a kitchen sink, as now ordinarily installed or available in the kitchens of houses, apartments and other dwellings.

The primary object of my invention is to provide a device that can be removably placed on the kitchen sink drainboard, or adjacent thereto, and which when so placed can be employed to receive and wash and drain dishes and be readily washed or otherwise scoured or cleaned after use and put aside to leave the kitchen sink readily and fully available for other uses.

Another object of my invention is to provide a dish washer capable of use and operation through water pressure available and obtainable through an ordinary kitchen sink faucet, or other usual water supply connection or fixture together with a motor driven recirculating pump.

Still another purpose is to so construct the parts that washing and rinsing water can be freely circulated under forced pressure, to thus reach all parts of the dishes, and at the same time shield against water splashing or otherwise spreading beyond the confines of the device.

A still further object is to provide means by which suds or soapy water is introduced to be circulated upon and around the dishes during the washing operation.

With the above and other objects in view, some of which will be apparent to those skilled in the art, and others being inherent in the construction and the operation or manner of use of the device, my invention includes certain novel features of construction and combinations and arrangements of parts which will be hereinafter more fully set forth in connection with the drawings, and pointed out in the appended claim.

In the drawing:

FIGURE 1 is a front view of my device with portions broken away to reveal the details of construction, FIGURE 2 is a transverse sectional view of the device taken along line 2—2 of FIGURE 1, looking in the direction of the arrows, FIGURE 3 is a fragmentary sectional view showing details of a detergent introducing device, and FIGURE 4 is a fragmentary view looking down on FIGURE 3 of the drawing.

Reference is now made to the accompanying drawing wherein the numeral 10 designates a basin-like enclosing housing having a removable cover 11 within which there is supported a wire or quick draining basket 12 into which the dishes to be washed may be placed. The showing of the basket is purely schematic and it is to be understood that various arrangements of dish supporting members 13 may be provided therein. The enclosing housing 10 has four pads 14 and is adapted to be positioned upon a drain board 15 of a conventional sink 16 in proximity with a hot and cold water supply source 17 from which there extends a water supply pipe 18 that will introduce water 19 at the bottom of the housing and preferably in the center thereof. At the sink end of the housing 10 there is a drain pipe 20 that communicates with the interior of the housing 10 behind a filter or screen 21. At the other end of the housing 10 there is a water circulating pump 22 which is here shown as driven by an electric motor 23 that is plugged into a conventional service outlet through a cable 24. The pump 22 has an intake bell 25 which terminates below the level of water 19 when the housing 10 is filled to the desired level. At the lower portion of the pump 22 there is a water delivery pipe 26 which supports a rotatable sprinkler head 27 that is adapted and arranged to rotate and project a spray of water upwardly through nozzles 28 carried thereby. Opposite the delivery pipe 26 the pump 22 has a second delivery pipe 29 that terminates into a horizontally split box-like fitting 30 the upper half of which carries a horizontally extending water delivery pipe 31 with a flat sprinkler head 32 from which water is discharged downwardly through the nozzles 33 and upon dishes placed in the dish supporting basket 12.

Upon now referring to FIGURE 3 of the drawing it will be noted that the split box-like fitting 30 is of sector-shape and the lower half thereof is cupped out as at 34 to provide a chamber into which a detergent soap powder may be placed when the upper half 35 thereof is turned about its axis as shown in FIGURE 4. Communicating with the chamber 34 there is a port 36 through which water directed through the delivery pipe 31 may flow to thus dissolve and entrain the detergent in the chamber 34. As is shown the split box-like fitting 30 is supported free of the cover 11 by a clamp 37.

The operation of my device will be as follows:

After the dishes to be washed have been placed in the draining basket 12, which it will be noted is mounted above the rotating sprinkler head 27 and also above the level of the water 19, water will be introduced into the enclosing housing 10 to a level substantially as indicated and below the sprinkler head 27. Following this and with the cover 11 removed the sprinkler head 32 will be turned about its axis as shown in FIGURE 4 to expose the chamber 34 of the split box-like fitting 30. After fitting 30 is closed and the cover 11 is in place the operation of the pump 22 will be started and the water 19 will be pumped from the enclosing housing 10 and caused to recirculate through the rotatable sprinkler head 27 and the fixed sprinkler head 32. During this operation the detergent in the split box-like housing 30 will be dissolved and distributed over the dishes through the sprinkler head 32. This operation with the entrained detergent will correspond with the washing cycle of a conventional automatic dishwasher. If desired a certain amount of additional water may be continuously introduced through the pipe 18 during this period to drain off the detergent water and to maintain a proper level of the water 19 in the housing 10. After the dishes have been thoroughly soaked and the detergent has been completely dissolved, the pump may then be continued in operation to provide a rinsing operation with clean water through the nozzles of the sprinkler heads 27 and 32 and finally the water will be drained off through the drain pipe 20 and into the sink 16.

While I have, for the sake of clearness and in order to disclose the invention so that the same can be readily understood, described and illustrated a specific device and arrangement, I desire to have it understood that this invention is not limited to the specific means disclosed, but may be embodied in other ways that will suggest themselves to persons skilled in the art. It is believed that this invention is new and all such changes as come within the scope of the appended claim are to be considered as part of this invention.

Having thus described my invention, what I claim and desire to secure by Letters Patent is:

In a portable dish washing machine the combination of an enclosing housing having a removable cover forming a water tight compartment, a removable basket in said housing for dishes to be washed, a water supply conduit for introducing water into the bottom of said housing, a connection located above the bottom of said housing for directing water above a predetermined level to a drain, a pump having an intake disposed below the level of water in said housing, said pump having a first discharge conduit terminating above said basket and a second discharge conduit terminating below said basket and above the level of water in said housing, a rotating sprinkler head mounted upon said second discharge conduit, a detergent carrying chamber communicating with and carried by said first discharge conduit from which a detergent therein will be introduced into the dish washing cycle, said detergent carrying chamber being formed with a relatively movable cover portion, and a sprinkler head carried by said cover portion adapted and arranged to open said chamber for the reception of a detergent when in the inoperative position and to close said chamber when in its operating position within said housing.

References Cited by the Examiner
UNITED STATES PATENTS

| | | | |
|---|---|---|---|
| 1,675,192 | 6/28 | Murdoch | 134—176 |
| 1,823,583 | 9/31 | Biskamp | 134—93 X |
| 2,038,260 | 4/36 | Ash | 134—93 |

CHARLES A. WILLMUTH, *Primary Examiner.*